UNITED STATES PATENT OFFICE.

HUGH WEIR AIRD AND CHARLES EDGAR FELCH, OF MONTREAL, CANADA.

PAINT.

SPECIFICATION forming part of Letters Patent No. 593,917, dated November 16, 1897.

Application filed July 20, 1896. Serial No. 599,925. (No specimens.)

*To all whom it may concern:*

Be it known that we, HUGH WEIR AIRD, treasurer, and CHARLES EDGAR FELCH, paint-manufacturer, of the city of Montreal, in the district of Montreal and Province of Quebec, Canada, have invented certain new and useful Improvements in Paints; and we do hereby declare that the following is a full, clear, and exact description of the same.

Our invention relates to paints for use particularly in painting the bottoms of vessels, although paint manufactured and applied according to our invention will be advantageous in many other instances; and the object of the invention is to enable a perfectly smooth and antifrictional surface to be obtained and one upon which neither salt nor fresh water will have any ill effect, while the paint at the same time preserves the surface upon which it may be applied for a greater length of time than has been possible when the paints heretofore known have been used.

The invention may be said briefly to consist, first, in compounding graphite and the well-known commercial composition "japan," and, further, in the method of so doing and of applying same in a manner to be hereinafter fully described.

We have discovered that a graphite indigenous to the Dominion of Canada and other places throughout the western continent can be used with even greater advantage than the well-known Ceylon graphite, owing doubtless to the presence in the "Canadian graphite," as we may term it, of about fifty per cent. of a disintegrating mineral substance very much resembling, if not actually, feldspar. We therefore prefer to use the Canadian graphite, although if a slight percentage of Ceylon graphite is added the result is to some extent superior.

In carrying out our invention the preferred method may be described as follows: A liquid vehicle or japan composition is first produced, which is composed of thirty gallons of raw linseed-oil, sixty gallons of spirits of turpentine, thirty pounds of litharge, five pounds of manganese oxid, and one hundred pounds of kauri-copal gum. A paste is then made by combining one hundred and ten pounds of finely-ground Canadian graphite and one hundred pounds of the liquid vehicle. This paste is then ground or thoroughly mixed by passing same several times through a water-cooled mill, after which it may be reduced to liquid or paint form by adding ten gallons of spirits of turpentine and one gallon of raw linseed-oil, which is generally found sufficient for the two hundred and ten pounds of paste.

When the Ceylon graphite is used alone, it is found advantageous to mix therewith a quantity of feldspar or similar substance and grind same together, the feldspar acting to a considerable extent as a disintegrator to overcome the natural scaliness of the graphite.

Of course the liquid vehicle or japan composition may be varied specifically to a considerable extent with regard to special coloring-matter, thinners, driers, and gums, and we therefore do not wish to be confined to the particular japan described, as we consider that an admixture of graphite and any japan containing as essentials oil and gum, with a thinner, as coming within the scope of our invention.

We might mention that linseed-oil, gum-shellac, and turpentine are the essentials most generally used in japan compositions.

A paint of the composition described is as readily applicable as ordinary paint and of a most permanent nature. The thinning of the paint may be varied according to the use for which it is intended. For instance, when durability alone is required, as in the case of the coating of the bottom of an ocean-going vessel, the paint should be thinned with black asphaltum, japan, and turpentine, or if the smoothest surface attainable and therefore one that will be antifrictional and antifouling and a durable one besides be required the paint should also be thinned with black asphaltum, japan, and turpentine, in slightly-varying proportions, while if an antifriction-surface alone is desired, as for a racing yacht or canoe, the paint will be thinned with turpentine alone.

We prefer to apply the paint as follows, in fact in many instances we have found it essential to do so: When the surface is smooth, the paint is applied in the same manner as ordinary paint and when dry rubbed with sandpaper, pumice-stone, or other polishing material; but when the surface is rough and unequal the paint is applied and before it is quite dry or in the condition known as "tacky" it is dusted over with some additional finely-powdered "graphite" and then rubbed, thus causing the additional graphite to combine with the paint in that condition and allow a surface to be evenly coated, whether the same be smooth or rough and unequal, and at the same time prevent the paint from being disturbed. The traveling pressure caused by a firm rubbing of the additional graphite into the paint as just described is found to impart a permanent coating of a hard and smooth metallic nature.

What we claim is as follows:

A paint consisting of a liquid vehicle composed of linseed-oil, spirits of turpentine, litharge, magnesium oxid, and kauri-copal gum, to which has been added Canadian graphite in the proportions specified.

Montreal, July 15, 1896.

HUGH WEIR AIRD.
CHARLES EDGAR FELCH.

Witnesses:
FRED. J. SEARS,
R. S. C. KIMBER.